(12) United States Patent
Johnson

(10) Patent No.: US 6,941,281 B1
(45) Date of Patent: *Sep. 6, 2005

(54) AUTOMATED PAYMENT

(75) Inventor: Barbara S. Johnson, Southport, CT (US)

(73) Assignee: Advanceme, Inc., Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/356,711

(22) Filed: Jul. 20, 1999

Related U.S. Application Data

(63) Continuation of application No. 08/890,398, filed on Jul. 9, 1997.

(51) Int. Cl.$^7$ .......................... G06F 17/60; G06F 17/00
(52) U.S. Cl. ........................ 705/40; 705/35; 705/38; 705/39
(58) Field of Search .................... 705/35, 38, 39, 705/40

(56) References Cited

U.S. PATENT DOCUMENTS

| | | | |
|---|---|---|---|
| 4,750,119 A | 6/1988 | Cohen et al. | 364/401 |
| 4,823,264 A * | 4/1989 | Deming | 705/39 |
| RE32,985 E * | 7/1989 | Nagata et al. | 705/41 |
| 4,914,587 A | 4/1990 | Clouse | 364/401 |
| 4,941,090 A | 7/1990 | McCarthy | 364/405 |
| 5,117,355 A | 5/1992 | McCarthy | 364/405 |
| 5,202,826 A | 4/1993 | McCarthy | 364/405 |
| 5,287,268 A | 2/1994 | McCarthy | 364/405 |
| 5,383,113 A | 1/1995 | Kight et al. | 364/401 |
| 5,465,206 A | 11/1995 | Hilt et al. | 364/406 |
| 5,466,919 A | 11/1995 | Hovakimian | 235/380 |
| 5,483,445 A * | 1/1996 | Pickering | 705/40 |
| 5,504,677 A | 4/1996 | Pollin | 364/408 |
| 5,638,519 A | 6/1997 | Haluska | 395/228 |
| 5,649,117 A | 7/1997 | Landry | 395/240 |
| 5,715,298 A * | 2/1998 | Rogers | 379/91.01 |
| 5,717,989 A * | 2/1998 | Tozzoli et al. | 705/37 |
| 5,748,908 A * | 5/1998 | Yu | 705/44 |

(Continued)

FOREIGN PATENT DOCUMENTS

EP 0 655 716 A2 5/1995

(Continued)

OTHER PUBLICATIONS

"Do You Need A Card Processor?" by Hearst, Catalog Age, vol. 13, No. 6, pp. 85-86, Jun. 1996.

(Continued)

*Primary Examiner*—James W. Myhre
(74) *Attorney, Agent, or Firm*—David M. Klein; Shearman & Sterling LLP

(57) ABSTRACT

Systems and methods for automated loan repayment involve utilizing consumer payment authorization, clearing, and settlement systems to allow a merchant to reduce an outstanding loan amount. After a customer identifier (e.g., a credit, debit, smart, charge, payment, etc. card account number) is accepted as payment from the customer, information related to the payment is forwarded to a merchant processor. The merchant processor acquires the information related to the payment, processes that information, and forwards at least a portion of the payment to a loan repayment receiver as repayment of at least a portion of the outstanding loan amount owed by the merchant. The loan repayment receiver receives the portion of the payment forwarded by the merchant processor and applies that portion to the outstanding loan amount owed by the merchant to reduce that outstanding loan amount.

19 Claims, 5 Drawing Sheets

U.S. PATENT DOCUMENTS

| | | | | |
|---|---|---|---|---|
| 5,757,917 A | * | 5/1998 | Rose et al. | 705/79 |
| 5,794,221 A | | 8/1998 | Egendorf | 705/40 |
| 5,832,460 A | | 11/1998 | Bednar et al. | 705/27 |
| 5,832,464 A | | 11/1998 | Houvener et al. | 705/45 |
| 5,842,185 A | | 11/1998 | Chancey et al. | 705/40 |
| 5,850,217 A | | 12/1998 | Cole | 345/326 |
| 5,890,137 A | | 3/1999 | Koreeda | 705/26 |
| 6,070,153 A | * | 5/2000 | Simpson | 705/36 |

FOREIGN PATENT DOCUMENTS

| | | |
|---|---|---|
| EP | 0 725 376 A2 | 6/1996 |
| JP | 63276669 | 11/1988 |
| WO | WO 92/06438 | 4/1992 |
| WO | WO 97/14124 | 4/1997 |

OTHER PUBLICATIONS

"Making The Banks Sweat", by Higgins, Credit Card Management, vol. 6 No. 1, pp. 46-52, Apr. 1993.

"Citicorp's Merchant Sale Casts a Shadow Over Bank Acquirers Bankers Refuse to Believe Their Acquiring Businesses Are Doomed", Credit Card News, vol. 5, No. 5, pp. 1-7, Jul. 15, 1992.

"USA: Determined Banks Still Dominate Processing of Card Receipts", by Gullo, American Banker, p. 17, Apr. 22, 1991.

"HP Keeps Cards Close to Chest with Acquisition of Verifone", Card News, p. 6, Apr. 28, 1997.

* cited by examiner

AUTOMATED PAYMENT

RELATED APPLICATIONS

This application is a continuation of U.S. Ser. No. 08/890,398, filed Jul. 9, 1997.

TECHNICAL FIELD

This invention relates to systems and processes for automated repayment of a loan by a merchant borrower via fees levied through an entity that processes payment transactions for the merchant.

BACKGROUND INFORMATION

Card (e.g., credit, debit, charge, smart, etc.) transactions generally involve at least merchants, merchant processors, issuers, and cardholders. Such transactions include authorization, clearing, and settlement processes, and may include the use of a system such as the VisaNet or Cirrus system to authorize, clear, and settle the card payment.

Loan repayment generally is performed by a borrower sending periodic payments directly to the lender by post or by electronic funds transfer through the banking system.

SUMMARY OF THE INVENTION

It is an object of the invention to provide an automated loan repayment system and process based on fees levied on payment transactions such as those involving unique identifying account numbers (e.g., credit, debit, charge, payment, smart, etc. card numbers).

The invention utilizes a merchant processor in the loan repayment process. The merchant processor may be, for example, a third party entity (i.e., an entity other than the borrower or the lender), the same entity as the lender, or an entity affiliated in some way with the lender. As an example, with some credit cards, the merchant processor can be a third party. As another example, with some cards such as the American Express charge card, the merchant processor can be the same as (or at least closely affiliated with) the lender. In general, a "merchant processor" is any entity that acquires merchant transactions such as a bank or other financial institution, or an organization dedicated to acquiring and processing merchant transactions. Acquiring merchant transactions generally means receiving payment information from a merchant or on behalf of a merchant, obtaining authorization for the payment from the card issuer, sending that authorization to the merchant, and then completing the transaction by paying the merchant, submitting the payment, and getting paid by the issuer. For this service, the merchant processor typically levies a fee on the merchant that is a percentage of the amount of the payment transaction. In general, the payment information forwarded to the merchant processor relates to a customer identifier submitted to the merchant as payment for some good(s) and/or service(s), and that identifier can be the account number associated with, for example, a debit card, a smart card, a credit card (e.g., a Visa or MasterCard card), a charge card (e.g., an American Express card), etc.

The invention relates to systems and processes for automated repayment of a loan made by a lender to a merchant. The systems and processes of the invention utilize consumer payment transactions with the merchant to allow the merchant to reduce the outstanding loan amount. Typically, a percentage of a consumer's payment to the merchant (e.g., by credit card) is used to pay down the merchant's outstanding loan. In one embodiment of the present invention, a merchant that has borrowed a loan amount from the lender accepts a customer-identifying account number (e.g., a credit, charge, payment, or debit card number) as payment from the customer and information related to the payment is forwarded to a merchant processor. Acceptance of this type of payment from the customer can be done, for example, at a merchant location (e.g., a retail establishment), over the telephone, or electronically via, for example, the World Wide Web by the merchant or on behalf of the merchant. The merchant processor then acquires the information related to the payment transaction, processes that information, and forwards at least a portion of the transaction amount to the lender as repayment of at least a portion of the outstanding loan amount owed by the merchant. The loan payments alternatively may be accumulated until a predetermined amount is reached, and then at least a portion of the accumulated payments is forwarded to the lender (or its designee). In another embodiment, the merchant processor may periodically forward at least a portion of the payment to the lender or designee. For example, the merchant processor may forward payment amounts every month, or based on an amount such as after each one thousand dollars ($1000) worth of transactions. The lender or designee (e.g., a bank or other lending institution, or an entity collecting payments on behalf of the lender) receives the portion of the payment forwarded by the merchant processor and applies that amount to the outstanding loan amount owed by the merchant to reduce that outstanding loan amount.

A system according to the invention automates repayment of a loan made by a lender to a merchant by utilizing payment transactions (e.g., credit, debit, charge, payment, smart, etc. card transactions) with the merchant. The system includes means for accepting a customer-identifying account number as payment from the customer and for forwarding information related to the payment to a merchant processor. In one embodiment, the merchant may use equipment provided by VeriFone Inc. of Redwood City, Calif., such as an electronic card swipe machine, to facilitate card transactions by customers. The merchant processor includes means for receiving the information related to the payment and means for forwarding a loan payment to the lender.

The invention thus automates the loan repayment process, and provides an easy and efficient mechanism by which merchants that accept customer-identifying account numbers (e.g., credit cards) as payment for good(s) and/or service(s) can repay loans. The borrowing merchants use one or more already-familiar payment transaction processing systems to make the payments required by the lender or the loan collecting entity. The invention makes loan repayment and collection simple and efficient for both the borrower and the lender.

The foregoing and other objects, aspects, features, and advantages of the invention will become more apparent from the following drawings, description, and claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1A:
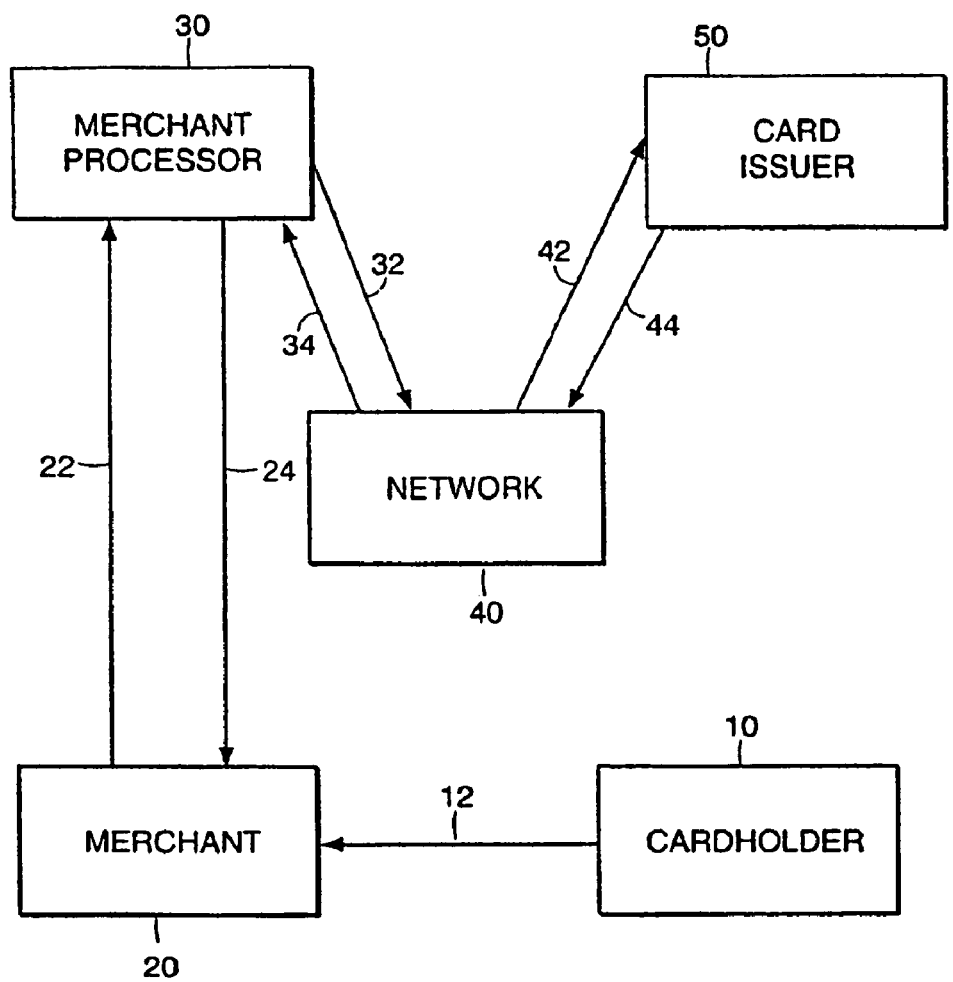
FIGS. 1A and 1B are schematic illustrations of a payment transaction from authorization (FIG. 1A) to settlement (FIG. 1B).
Figure 1B:
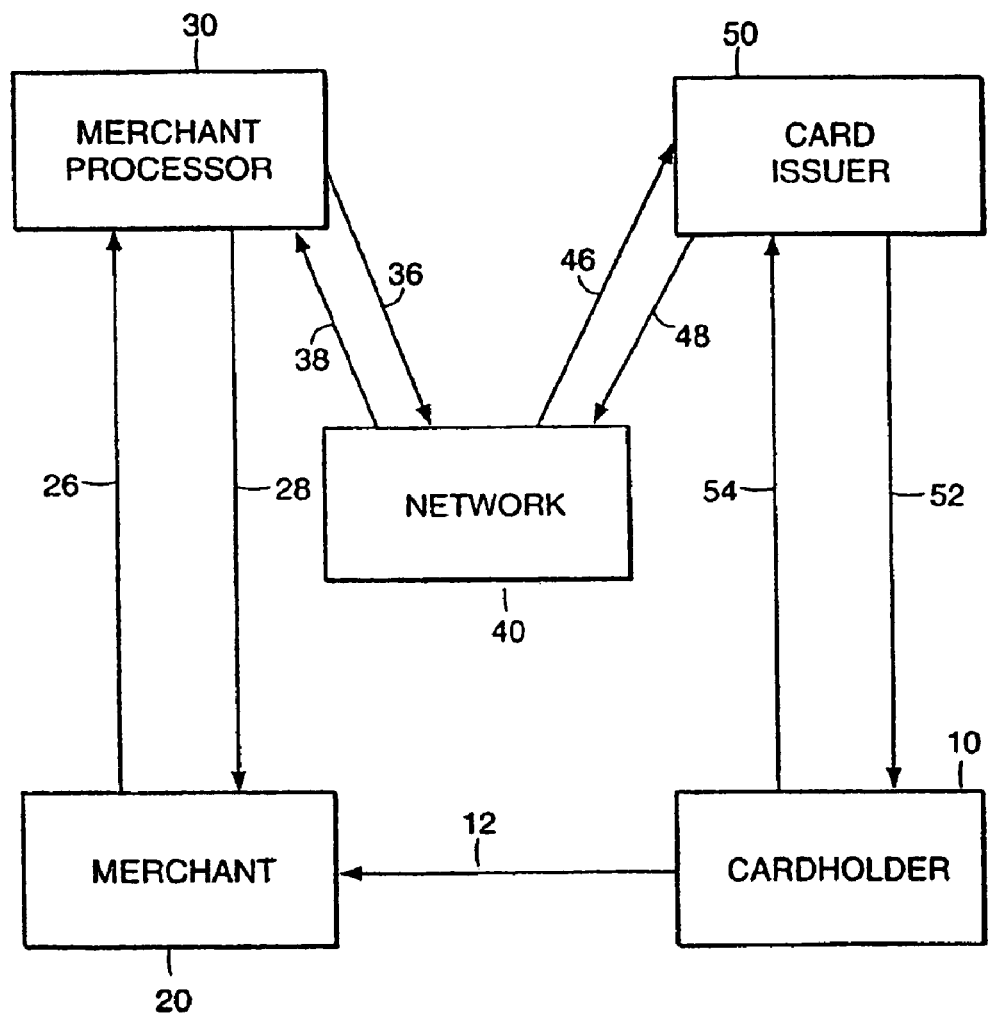

Referring to FIGS. 1A and 1B, a purchase transaction (e.g., a credit card transaction) generally begins with a cardholder 10 providing a customer identifier (typically, a unique identifying account number such as that on a credit card such as a Visa or MasterCard card, a debit card, a smart card, a charge card such as an American Express card, etc.) to a merchant 20, as indicated by an arrow 12, for payment of goods and/or services purchased by the customer. The merchant can be any business that accepts such form of payment for the goods and/or services provided to customers by the business. The cardholder 10 might present the card to the merchant 20 in person, or the cardholder 10 might provide the card number to the merchant over the telephone or electronically by computer (e.g., via the World Wide Web, WWW). Also, the cardholder 10 might provide the card number to an entity acting on behalf of the merchant such as a WWW provider that sets up and maintains the merchant's Web page(s). However the customer identifier (e.g., card number) gets to the merchant or the merchant's agent, authorization must be obtained before the payment can be accepted and the purchase transaction completed.

Figure 2:
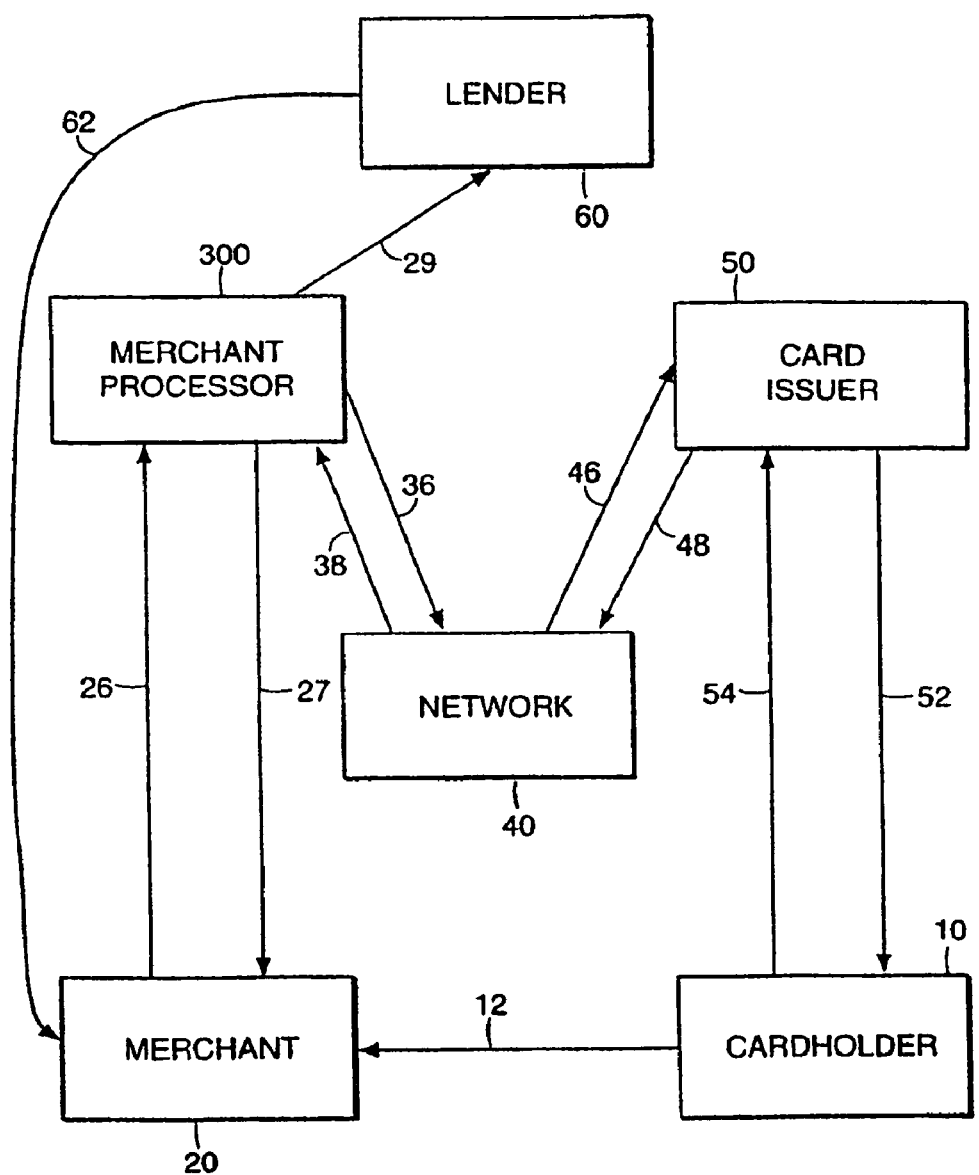
FIG. 2 is a block diagram of a merchant processor making payment to both a merchant and a lender, in accordance with the invention.

Authorization, as shown in FIG. 1A, involves an authorization request going to a merchant processor 30, as indicated by an arrow 22. The request generally gets to the merchant processor 30 electronically by, for example, transmission through the telephone system and/or some other network (e.g., the Internet and/or an intranet). The merchant processor 30 (also known as an acquirer because it acquires merchant transactions) then routes the authorization request to a card issuer 50 via a network 40, as indicated by arrows 32 and 42. In some embodiments, the merchant processor 30 (300 in FIGS. 2 and 3A) is the bank of the merchant 20, and the card issuer 50 is the cardholder's bank. The routing generally is performed electronically in a manner mentioned above (i.e., via one or more public and/or private networks). The network 40 may be, for example, the VisaNet system. Other examples of the network 40 include debit card processing network systems (e.g., Cirrus), the American Express card network, and the Discover (Novus) card network. It may be possible to bypass the network 40 and send the authorization request directly from the merchant processor 30 to the card issuer 50. In some instances, the card issuer 50 also performs the function of acquiring merchant transactions (American Express is an example). Also, the merchant processor 30 and the card issuer 50 can be merged, and the authorization request will then go only to the merchant processor 30 which itself then can approve or disapprove the request because the merchant processor 30 and the card issuer 50 are now the same entity. In the case where the network 40 is used and the card issuer 50 and the merchant processor 30 are separate (organizationally and/or physically) entities, the card issuer 50 receives the authorization request via the network 40 and either approves or disapproves the request. An example of when the card issuer 50 may disapprove the authorization request is when the cardholder 10 has reached the maximum limit on the card or if the card number has been fraudulently obtained. Assuming the request is approved, the card issuer 50 sends approval of the authorization to the merchant processor 30 via the network 40, as indicated by arrows 44 and 34. The merchant processor 30 then passes on the authorization approval to the merchant, as indicated by an arrow 24. With the approval, the second part of the card transaction can now occur. This return path (i.e., arrows 44, 34, and 24) also can be accomplished by electronic transmission through one or more private and/or public network systems. In general, all of the arrows in FIGS. 1A, 1B, and 2 represent electronic transmissions, except possibly for arrows 12, 22, 24, 26, 52, and 54 which may involve other types of transmission such as physical delivery (e.g., a card handed over by the cardholder/customer 10) or post (e.g., a bill sent to the cardholder 10 via the U.S. Postal Service or other carrier) or by telephone.

Referring to FIG. 1B, to complete the purchase transaction, the dollar amount of the customer's purchase is forwarded to the merchant processor 30 by the merchant 20, as indicated by an arrow 26. The merchant processor 30 pays the merchant 20 some amount less than the amount submitted to the merchant processor 30. The merchant processor 30 typically charges a fee, often referred to as a discount rate, for processing the purchase transaction. For example, the customer's purchase may have been $100, and with a discount rate of 1.9%, the merchant 20 is paid $98.10 (i.e., $100 less the 1.9% discount rate) by the merchant processor 30. The merchant processor 30 submits the entire amount of the customer's purchase to the card issuer 50 via the network 40, as indicated by arrows 36 and 46. Again, the network 40 may be eliminated, and the merchant processor and card issuer functions may be contained in one entity. In the case where the network 40 is included and the merchant processor and card issuer functions are separate, the card issuer 50, via the network 40, pays the merchant processor 30 some amount less than the amount submitted to the card issuer 50 by the merchant processor 30, as indicated by arrows 48 and 38. This reduced amount reflects another fee levied on the transaction by the card issuer 50, often referred to as an interchange fee. The interchange fee is often part of the discount rate. The merchant processor 30 then in turn pays the merchant 20 (e.g., by forwarding payment to a bank having an account maintained by the merchant 20) some amount less than the customer's original purchase amount, as indicated by an arrow 28. For example, with an original customer purchase of $100, and with an interchange fee of 1.4%, the merchant processor 30 is paid $98.60 (i.e., $100 less the 1.4% interchange fee) by the card issuer 50. This amount is further reduced by the merchant processor's fee. Thus, in this $100 original customer purchase example, the merchant 20 is paid $98.10 by the merchant processor 30, the merchant processor 30 makes $0.50, and the card issuer makes $1.40. Stated another way, the merchant 20 pays 1.9% for the ability to offer customers the convenience of paying by card, and that 1.9% fee or surcharge is allocated to the merchant processor 30 (0.5%) and the card issuer (1.4%) for providing the merchant 20 with that ability.

The card issuer 50 bills the customer or cardholder 10 for the full amount of the original purchase (e.g., $100), and the cardholder 10 is responsible for paying that amount, plus any interest and other fees, in full or in installment payments. Also, when the network 40 is used, both the merchant processor 30 and the card issuer 50 generally pay a fee to the provider of the network 40. For example, in the case of VisaNet, the merchant processor might pay $0.069 to VisaNet as a card service fee, and the card issuer 50 might pay VisaNet $0.059 as a card service and transaction fee. These payments by the merchant processor 30 and the card issuer 50 to the provider of the network 40 reduce the amount made off of the surcharge (e.g., 1.9%) imposed on the merchant 20.

Having described the environment in which the invention operates with reference to FIGS. 1A and 1B, the automated loan repayment system and process according to the invention will now be described with reference to FIGS. 2, 3A, and 3B.

Referring to FIG. 2, a lender 60 makes a loan to the merchant 20, as indicated by an arrow 62. The merchant 20 then is required to pay back the full loan amount plus interest, and possibly fees. Currently, the merchant 20 typically pays the outstanding loan back in periodic installments (e.g., equal monthly payments over five years). The merchant 20 may make these payments to the lender 60 or to some other loan repayment receiver. In FIG. 2, the loan repayment receiver is identified as the lender 60. In accordance with the invention, a purchase transaction occurs as indicated in FIG. 1B except that the final step where the merchant processor pays the merchant is altered. That is, the payment indicated by the arrow 28 is altered. The invention involves a merchant processor 300 designed to pay a portion of what would normally go to the merchant 20 to the lender 60 as repayment of at least a portion of the merchant's outstanding loan amount, as indicated by an arrow 29. The lender 60 then receives that portion of the payment forwarded by the merchant processor 300 and applies it to the merchant's outstanding loan amount to reduce that outstanding loan amount. The merchant processor 300 thus pays the merchant 20 some amount less than what the merchant 20 would receive in the arrangement of FIG. 1B, as indicated by an arrow 27 in FIG. 2. For example, carrying on with the example introduced above with reference to FIGS. 1A and 1B, instead of paying $98.10 to the merchant 20 on a $100 original card purchase, the merchant processor 300 might send $88.10 to the merchant 20 and the other $10.00 to the lender 60.

In accordance with the invention, there can be a number of variations on how and when the merchant processor 300 pays the lender 60. For example, the merchant processor 300 can accumulate the payments received from the card issuer 50 (via arrows 48 and 38) until a predetermined dollar amount is reached, and then the merchant processor 300 can forward at least a portion of the accumulated payments to the lender 60. Also, as another example, the merchant processor 300 can periodically forward payment to the lender 60, such as upon every other payment received from the card issuer 50.

Figure 3A:
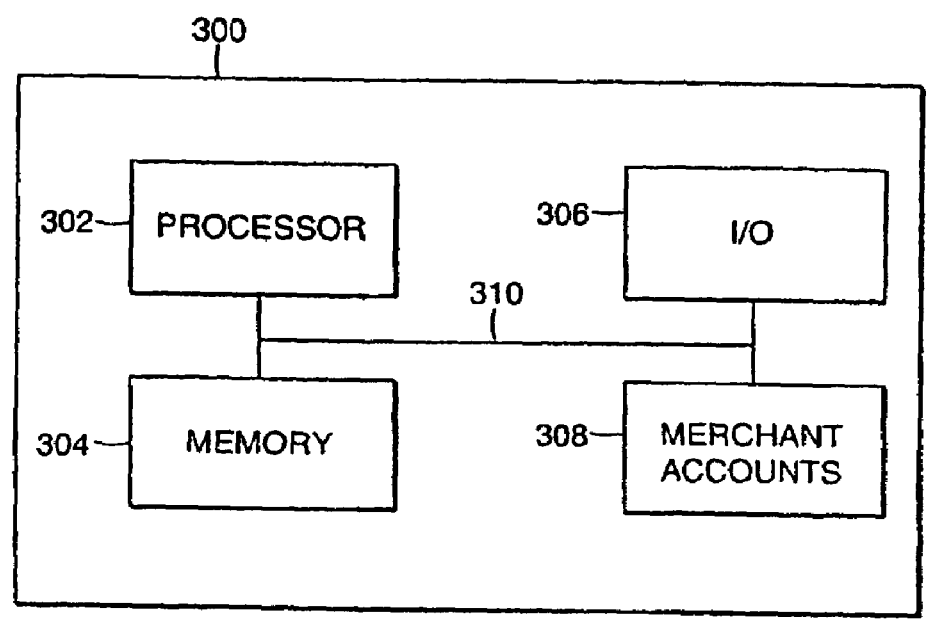
FIG. 3A is a diagram of a merchant processor system according to the invention.

Referring to FIG. 3A, the merchant processor 300 according to the invention typically includes at least a processor 302, memory 304, an input/output (I/O) device 306, a merchant accounts database 308, and a bus 310 or other means for allowing these components to communicate. The I/O module 306 allows the merchant processor 300 to communicate electronically with the other components (e.g., the merchant 20, the network 40, the card issuer 50, and the lender 60) in the card transaction processing system shown in the drawings. The processor 302 and the memory 304 cooperate with each other and with the other components of the merchant processor 300 to perform all of the functionality described herein. In one embodiment, the merchant processor 300 executes appropriate software to perform all of the functionality described herein. In an alternative embodiment, some or all of the functionality described herein can be accomplished with dedicated electronics hardwired to perform the described functions. The merchant accounts database 308 can include information identifying all merchants 20 with which the merchant processor 300 is authorized to do business (e.g., at least a plurality of unique merchant code numbers), and it also can include information about which lender 60 is associated with each authorized merchant 20 and how (e.g., dollar amounts and frequency) payments are to be made to the lenders 60 by the merchant processor 300. The merchant processor 300 according to the invention can be an appropriately programmed computer such as a mainframe, minicomputer, PC, or Macintosh computer, or it can include a plurality of such computers cooperating to perform the functionality described herein. Similarly, the other components of the card transaction system (e.g., the merchant 20, the network 40, the card issuer 50, and the lender 60) according to the invention typically include one or more appropriately programmed computers for implementing the functionality described herein.

Figure 3B:
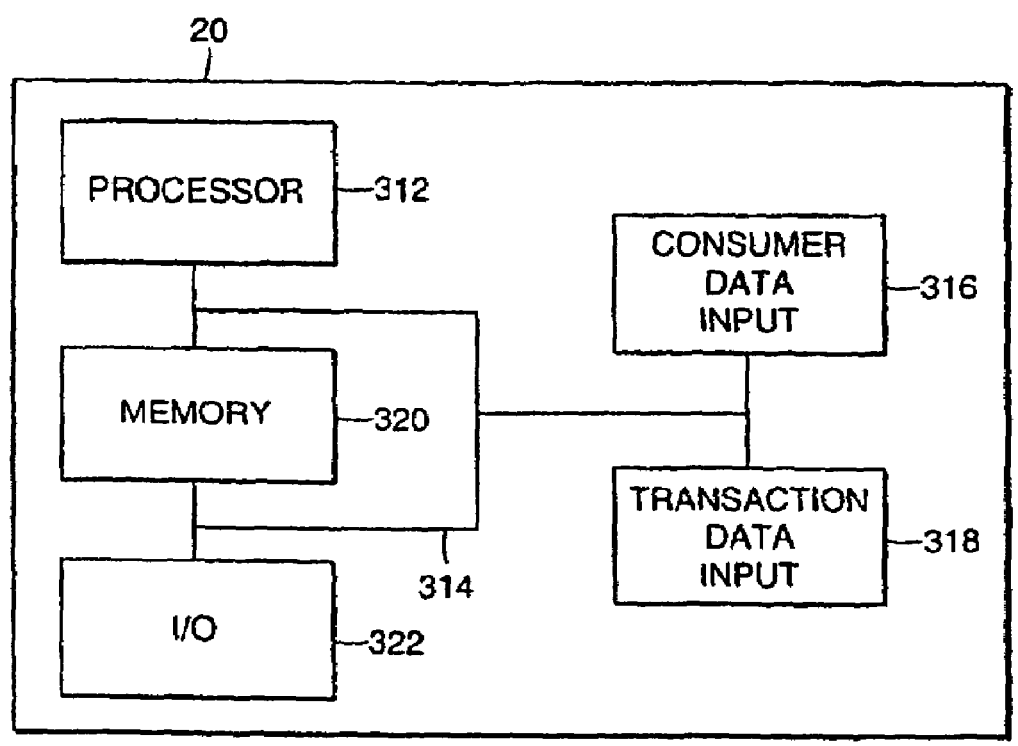
FIG. 3B is a diagram of a merchant location.

Referring to FIG. 3B, the merchant 20 typically includes at least one computer unit 312, such as a microprocessor and associated peripherals, that communicates over a bus 314 with a consumer data input device 316, a transaction data input device 318, memory 320, and an input/output (I/O) device 322. The consumer data input device 316 is located at the point-of-sale to a consumer of merchandise or services from the merchant. The device 316 can include a keyboard for use to enter a consumer's account number/identifier, or alternatively it can include a magnetic card reader for reading a magnetic stripe on a plastic card inserted into the reader. With such a magnetic stripe card, the stripe is encoded with the identifier (e.g., the customer's Visa credit card account number). When such a plastic card is used, the device 316 also may include a keyboard for entry of a personal identification number (PIN) for verifying against a code stored in or on the card. The transaction data input device 318 also is located at the point-of-sale, and it typically includes a keyboard or the like for use by, for example, a sales clerk to enter the dollar amount of the merchandise or service purchased by the customer and possibly other related information. The device 318 could include a cash register. In some embodiments, the devices 316 and 318 can share a single keyboard. The consumer and transaction data entered through the devices 316 and 318 may be temporarily stored in the memory 320. The memory 320 also may include merchant data along with software to direct operation of the computer 312. The merchant data typically will include at least a merchant code number to identify the merchant, and merchant data also may include information indicating the time or location of the sale and/or the sales clerk involved in the purchase transaction, for example. The merchant 20 may have more than one point-of-sale locations and each such location can be equipped with consumer and transaction data input devices 316 and 318. Similarly, memory 320 and I/O devices 322 can be replicated at each point-of-sale location at the merchant 20. In one embodiment, only the devices 316 and 318 are replicated at the merchant 20 such that only one computer 312 is needed by each single merchant location. VeriFone Inc. of Redwood City, Calif., for example, provides such merchant-location equipment.

Referring now to both FIG. 3A and FIG. 3B, the merchant processor 300 and the merchant 20 can communicate through the I/O devices 306 and 322. These devices 306 and 322 can be modems, for example.

While only one merchant 20 and one lender 60 are shown in the drawings, it should be understood that in general a plurality of merchants 20 will interact with the merchant processor 300, and the merchant processor 300 could interact with one or more lenders 60, in accordance with the invention. The different merchants 20 generally will have varying outstanding loan amounts owed to one or more of the various lenders 60. The invention has been shown and described with reference to one merchant 20 and one lender 60 for simplicity and ease of understanding. Also, as stated previously, the merchant processor 300 and the card issuer 50 can be separate entities (as is generally the case with Visa card processing) or the same entity, or at least affiliated entities, (as is generally the case with American Express card processing).

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for automated payment, comprising:
    at a merchant, accepting a customer identifier as payment from the customer and electronically forwarding information related to the payment to a computerized merchant processor;
    at the computerized merchant processor, acquiring the information related to the payment from the merchant, authorizing and settling the payment, and forwarding at least a portion of the payment to a computerized payment receiver as payment of at least a portion of an obligation made by the merchant; and
    at the computerized payment receiver, receiving the portion of the payment forwarded by the computerized merchant processor and applying that portion to the outstanding obligation made by the merchant to reduce such obligation.

2. The method of claim 1 wherein the accepting step comprises accepting a credit card number as the customer identifier.

3. The method of claim 1 wherein the accepting step comprises accepting a debit card number as the customer identifier.

4. The method of claim 1 wherein the accepting step comprises accepting a smart card number as the customer identifier.

5. The method of claim 1 wherein the accepting step comprises accepting a charge card number as the customer identifier.

6. The method of claim 1 wherein the accepting step comprises accepting the customer identifier at a merchant location.

7. The method of claim 1 wherein the accepting step comprises electronically accepting the customer identifier.

8. The method of claim 1 wherein the steps performed at the merchant processor further comprise accumulating the payments until a predetermined amount is reached and then forwarding at least a portion of the accumulated payments to the payment receiver.

9. The method of claim 1 wherein the steps performed at the merchant processor comprise periodically forwarding at least a portion of the payment to the payment receiver.

10. A system for automated payment of an obligation made by a merchant, comprising:
    at a merchant, means for accepting a customer identifier as payment from the customer and for electronically forwarding information related to the payment to a computerized merchant processor, wherein the merchant associated with the payment has an outstanding obligation to a third party; and
    at the computerized merchant processor, means for receiving the information related to the payment from the merchant, means for authorizing and settling the payment, and
    means for forwarding a portion of the payment to the third party to reduce the obligation.

11. The system of claim 10 wherein the accepting means comprises means for accepting a credit card number as the customer identifier.

12. The system of claim 10 wherein the accepting means comprises means for accepting a debit card number as the customer identifier.

13. The system of claim 10 wherein the accepting means comprises means for accepting a smart card number as the customer identifier.

14. The system of claim 10 wherein the accepting means comprises means for accepting a charge card number as the customer identifier.

15. The system of claim 10 wherein the accepting means comprises means for accepting the customer identifier at a merchant location.

16. The system of claim 10 wherein the accepting means comprises means for electronically accepting the customer identifier.

17. The system of claim 10 wherein the means at the merchant processor further comprise means for accumulating the payments until a predetermined amount is reached and means for forwarding at least a portion of the accumulated payments to the third party.

18. The system of claim 10 wherein the forwarding means at the merchant processor comprises means for periodically forwarding at least a portion of the payment to the third party.

19. The system of claim 10 wherein the forwarding means at the merchant processor comprises means for forwarding to the third party an amount that is a percentage of the obligation.

* * * * *